(12) United States Patent
Hikida et al.

(10) Patent No.: US 9,196,031 B2
(45) Date of Patent: Nov. 24, 2015

(54) APPEARANCE INSPECTION APPARATUS AND METHOD

(71) Applicant: DAINIPPON SCREEN MFG. CO., LTD., Kyoto (JP)

(72) Inventors: Yuichiro Hikida, Kyoto (JP); Takeshi Saruwatari, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 233 days.

(21) Appl. No.: 13/733,206

(22) Filed: Jan. 3, 2013

(65) Prior Publication Data

US 2013/0182941 A1   Jul. 18, 2013

(30) Foreign Application Priority Data

Jan. 17, 2012   (JP) .................................. 2012-006961
Jan. 17, 2012   (JP) .................................. 2012-007274

(51) Int. Cl.
*G06T 7/00*   (2006.01)

(52) U.S. Cl.
CPC ............... *G06T 7/0004* (2013.01); *G06T 7/001* (2013.01); *G06T 2207/30148* (2013.01)

(58) Field of Classification Search
CPC .................... G06T 7/0004; G06T 2207/30148
USPC ................................................. 382/144–151
See application file for complete search history.

(56) References Cited

U.S. PATENT DOCUMENTS

| | | | |
|---|---|---|---|
| 5,293,620 | A | 3/1994 | Barabash et al. |
| 6,400,839 | B1 * | 6/2002 | Takayama ..................... 382/145 |
| 6,629,051 | B2 * | 9/2003 | Tanaka ............................. 702/81 |
| 6,674,889 | B1 * | 1/2004 | Takayama ..................... 382/149 |

(Continued)

FOREIGN PATENT DOCUMENTS

| | | |
|---|---|---|
| JP | 2-224186 | 9/1990 |
| JP | 3-103963 | 4/1991 |

(Continued)

OTHER PUBLICATIONS

Office Action issued by Korean Patent Office on 02/27/14 in connection with corresponding Korean Patent Application No. 10-2013-0004688 with Japanese and English Translation thereof.

(Continued)

*Primary Examiner* — Uptal Shah
(74) *Attorney, Agent, or Firm* — Ostrolenk Faber LLP

(57) ABSTRACT

An appearance inspection apparatus comprises an inspection part for detecting a defect of a pattern on the basis of an image of a surface of a substrate on which the pattern is formed, which is captured by an imaging part. The inspection part comprises an image transfer part for transferring image data which is obtained by imaging a region to be inspected on the substrate and stored in an image storing memory by the imaging part to a plurality of image processing memories and a plurality of GPUs for taking image data corresponding to respective regions to be processed out of transferred image data which are transferred to the image processing memories by the image transfer part and performing an inspection process for defect detection on the image data. The inspection part further comprises an image processing control part for acquiring inspection tasks each prescribing inspection details from an inspection task holding part and controlling the plurality of GPUs in accordance with the inspection tasks, respectively, independently of the image transfer by the image transfer part.

9 Claims, 11 Drawing Sheets

(56) References Cited

U.S. PATENT DOCUMENTS

| | | | |
|---|---|---|---|
| 7,149,341 B2* | 12/2006 | Hayashi et al. | 382/145 |
| 7,181,368 B1* | 2/2007 | Bhaskar et al. | 702/185 |
| 7,388,979 B2 | 6/2008 | Sakai et al. | |
| 7,792,352 B2 | 9/2010 | Sakai et al. | |
| 8,005,292 B2 | 8/2011 | Sakai et al. | |
| 8,275,190 B2 | 9/2012 | Sakai et al. | |
| 8,340,395 B2 | 12/2012 | Sakai et al. | |
| 8,488,866 B2* | 7/2013 | Terasawa et al. | 382/144 |
| 8,630,476 B2* | 1/2014 | Okada et al. | 382/141 |
| 8,639,019 B2 | 1/2014 | Sakai et al. | |
| 2001/0053245 A1* | 12/2001 | Sakai et al. | 382/151 |
| 2005/0147287 A1 | 7/2005 | Sakai et al. | |
| 2006/0165273 A1* | 7/2006 | Akiyama | 382/145 |
| 2006/0182334 A1* | 8/2006 | Akimoto | 382/145 |
| 2007/0030479 A1* | 2/2007 | Park et al. | 356/237.2 |
| 2008/0232674 A1 | 9/2008 | Sakai et al. | |
| 2009/0245619 A1* | 10/2009 | Oaki et al. | 382/144 |
| 2009/0290783 A1 | 11/2009 | Sakai et al. | |
| 2010/0141755 A1 | 6/2010 | Iwanaga et al. | |
| 2010/0225905 A1 | 9/2010 | Hayashi | |
| 2010/0328446 A1 | 12/2010 | Sakai et al. | |
| 2011/0063284 A1* | 3/2011 | Sudoh | 345/418 |
| 2011/0109738 A1 | 5/2011 | Sakaguchi et al. | |
| 2011/0127429 A1 | 6/2011 | Miyamoto et al. | |
| 2011/0304725 A1 | 12/2011 | Sakai et al. | |
| 2013/0004057 A1 | 1/2013 | Sakai et al. | |
| 2013/0050469 A1* | 2/2013 | Takezawa et al. | 348/92 |
| 2014/0002814 A1 | 1/2014 | Sakaguchi et al. | |

FOREIGN PATENT DOCUMENTS

| | | |
|---|---|---|
| JP | 4-172570 | 6/1992 |
| JP | 2000-047995 | 2/2000 |
| JP | 2003-141508 | 5/2003 |
| JP | 2003-208627 | 7/2003 |
| JP | 2005-158780 | 6/2005 |
| JP | 2006-269624 | 10/2006 |
| JP | 2008-071261 | 3/2008 |
| JP | 2009-145285 | 7/2009 |
| JP | 200-9-281898 | 12/2009 |
| JP | 2009-281836 | 12/2009 |
| JP | 2010-216963 | 9/2010 |
| JP | 2011-028410 | 2/2011 |
| TW | 2009-33141 | 8/2009 |
| TW | 2009-51429 | 12/2009 |
| TW | 2010-05282 | 2/2010 |
| TW | 2010-33604 | 9/2010 |
| TW | 2011-09645 | 3/2011 |

OTHER PUBLICATIONS

Office Action issued by Chinese Patent Office on Sep. 29, 2014 in connection with corresponding Chinese Patent Application No. 2013100176184 with Japanese and English Translation thereof.

Office Action issued by Taiwan Patent Office on Oct. 1, 2014 in connection with corresponding Taiwan Patent Application No. 10-2101-681 with Japanese and English Translation thereof.

Office Action issued by Japanese Patent Office on May 19, 2015 in connection with corresponding Japanese Patent Application No. 2012-007274 with English Translation thereof.

Office Action issued by Japanese Patent Office on May 19, 2015 in connection with corresponding Japanese Patent Application No. 2012-006961 with English Translation thereof.

Office Action issued by the Japanese Patent Office on Sep. 15, 2015 in connection with corresponding Japanese Patent Application No. 2012-006961.

* cited by examiner

F I G . 1
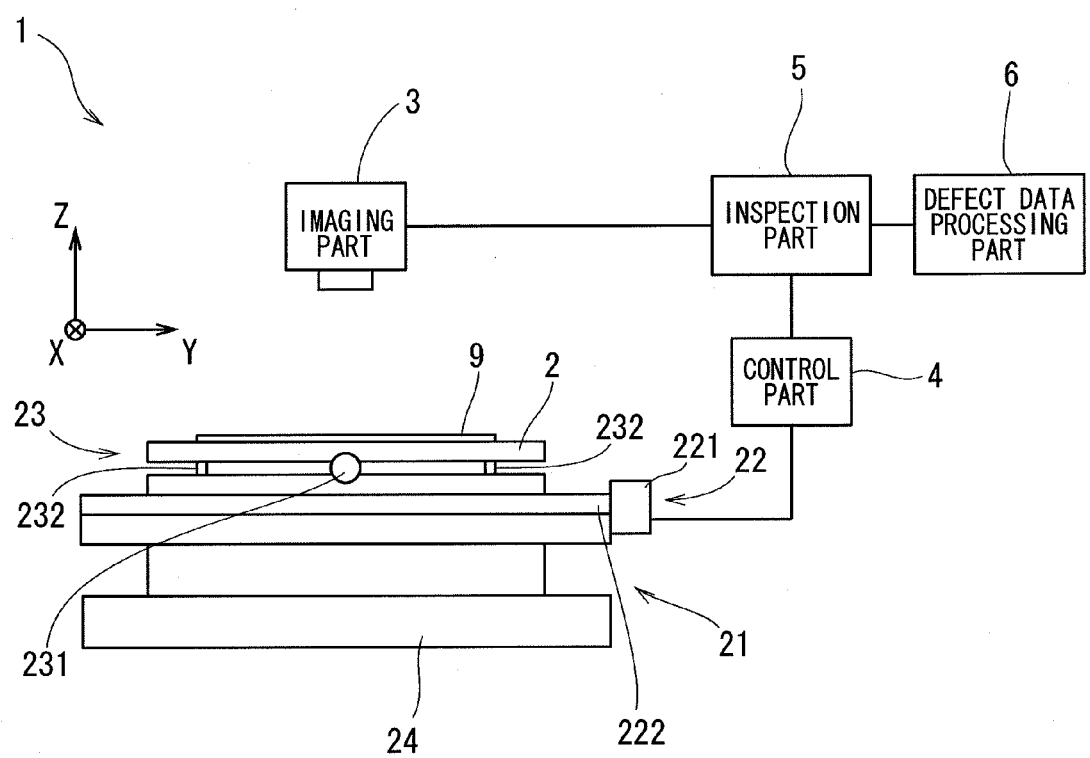

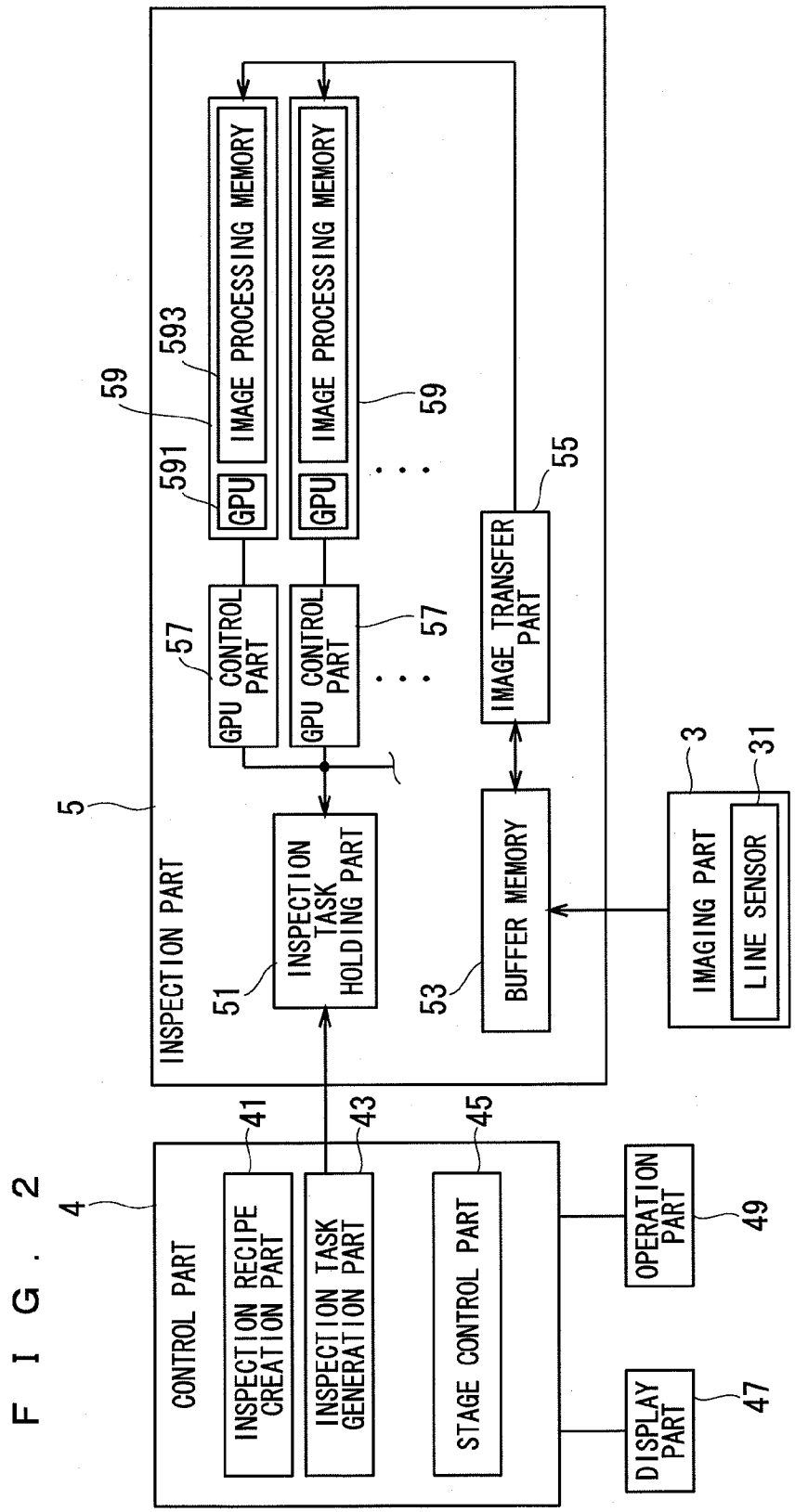
F I G . 2

F I G . 3
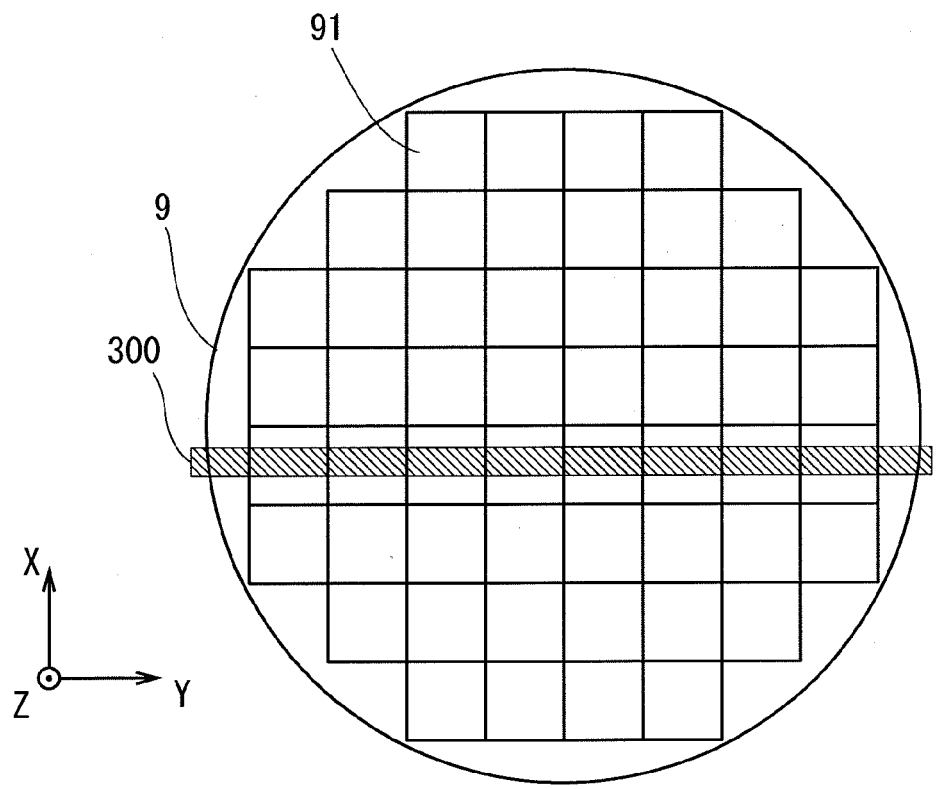

F I G . 5
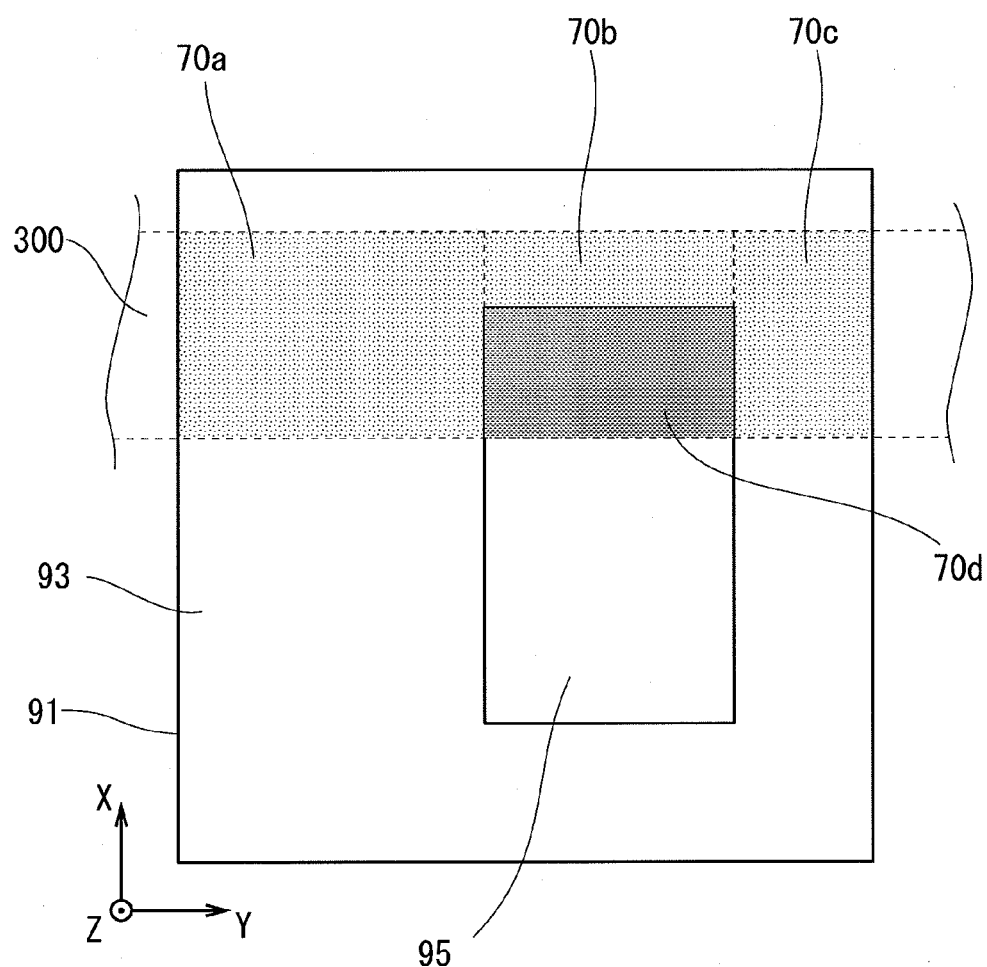

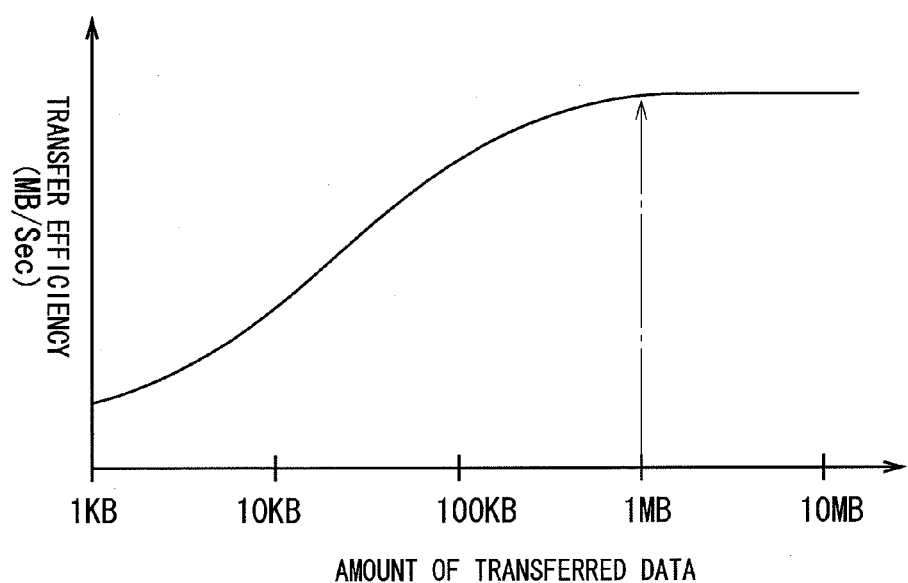
F I G . 6

APPEARANCE INSPECTION APPARATUS AND METHOD

BACKGROUND OF THE INVENTION

1. Field of the Invention

The present invention relates to a technique for inspecting a defect of a pattern formed on a substrate.

2. Description of the Background Art

Conventionally, in order to detect a defect of a circuit pattern formed on a substrate such as a semiconductor wafer, an appearance inspection in which an image of the circuit pattern is acquired and a defective portion is extracted on the basis of a comparison with a reference image serving as a reference has been performed. Recently, for high-speed inspection, an appearance inspection apparatus allowing parallel data processing, which comprises a plurality of processor elements, has been proposed (for example, in Japanese Patent Application Laid Open Gazette No. 2011-028410).

Specifically, in the appearance inspection apparatus disclosed in Japanese Patent Application Laid Open Gazette No. 2011-028410, when an image which is scanned by a line sensor is divided, a general control computer sets conditions for allocating the divided images to the plurality of processor elements. Then, an image allocation part divides the image and transfers the divided images to the processor elements, respectively, in accordance with the allocation conditions. Each of the processor elements performs a prescribed inspection and extracts a defect of the circuit pattern.

Further, the appearance inspection apparatus disclosed in Japanese Patent Application Laid Open Gazette No. 2011-028410 controls a range of an image to be cut out on the basis of the processing capability of the processor elements and the computational load of each inspection algorithm. The appearance inspection apparatus thereby imposes uniform load onto the processor elements to efficiently use the processing capabilities of the processor elements.

In recent years, inspection of substrates on which very small dies (chips) such as power devices, organic ELs, LEDs or the like are formed has been increasingly demanded. When a substrate on which such a very small die is formed is inspected in the appearance inspection apparatus disclosed in Japanese Patent Application Laid Open Gazette No. 2011-028410, the size of the divided image disadvantageously becomes very small in some cases. In such cases, in the background-art appearance inspection apparatus, since an enormous number of image transfers occur, the time of overhead for communication occurring in the transfer of the image data, or the like, is disadvantageously made longer relatively to the time for transfer of the image data. Therefore, there is a possibility of significantly decreasing the transfer efficiency due to the overhead. When the transfer efficiency decreases, the inspection time is consequently prolonged, and therefore it becomes hard to perform an efficient inspection.

Further, in the appearance inspection apparatus disclosed in Japanese Patent Application Laid Open Gazette No. 2011-028410, in order to impose the computational load onto the processor elements in a good balance, it is necessary to perform an experimental inspection in advance to control the load ratio for the processor elements. Furthermore, if the processor elements are increased in order to reduce the inspection time, this further requires a complicated operation for controlling the load ratio for the processor elements again.

In the appearance inspection apparatus disclosed in Japanese Patent Application Laid Open Gazette No. 2011-028410, prior to the inspection, an image which is cut out and a processor element for processing the image are associated with each other. Therefore, the processing time sometimes varies depending on the size or the amount of defects included in the image which is cut out, and there is a strong possibility of breaking the balance of the loads imposed on the plurality of processor elements.

SUMMARY OF THE INVENTION

The present invention is intended for an appearance inspection apparatus for detecting a defect of a pattern on the basis of an image of a substrate on which the pattern is formed, which is captured by an imaging part.

According to one aspect of the present invention, the appearance inspection apparatus comprises an image transfer part for transferring image data which is obtained by imaging a region to be inspected on the substrate and stored in an image storing memory by the imaging part to a plurality of image processing memories, a plurality of image processing parts for performing inspection processes for defect detection on image data corresponding to respective regions to be processed thereby, out of transferred image data which are transferred to the image processing memories by the image transfer part, and a plurality of image processing control parts for acquiring inspection tasks each prescribing inspection details and controlling the plurality of image processing parts in accordance with the inspection tasks, respectively, independently of image transfer by the image transfer part.

In the appearance inspection apparatus in accordance with this aspect of the present invention, since the transfer of the image data obtained by imaging operation of the imaging part and the inspection process performed by the image processing part are performed independently of each other, the image data can be transferred from the image storing memory to the image processing memory with high transfer efficiency. Therefore, it is possible to suppress a decrease in the transfer efficiency due to the overhead in the image transfer and ensure an efficient inspection.

Preferably, the image processing control parts determine whether or not the image data to be inspected by the image processing parts are included in the transferred image data which are transferred to the image processing memories, and when no image data to be inspected is included, the image processing control parts cause the image processing parts to wait until the image data to be inspected by the image processing parts are transferred to the image processing memories.

The appearance inspection apparatus in accordance with this aspect of the present invention can cause the image processing part to wait until the image data to be inspected by the image processing part is transferred. Therefore, it is possible to reliably perform the inspection process on the image data to be inspected by the image processing part.

Preferably, the image transfer part transfers the image data to the image processing memory when the image data in predetermined amount is stored in the image processing memory.

In the appearance inspection apparatus in accordance with this aspect of the present invention, since the image data in a relatively large data amount can be transferred in one operation, it is possible to suppress a decrease in the transfer efficiency.

Preferably, the imaging part includes a line sensor, and the image transfer part transfers the image data to the image processing memory when image data having a predetermined number of lines is acquired and stored in the image processing memory by the imaging part.

In the appearance inspection apparatus in accordance with this aspect of the present invention, it is possible to transfer the image data in accordance with the number of detections by the line sensor (the number of lines).

Preferably, the image processing part includes a GPU (Graphics Processing Unit).

In the appearance inspection apparatus in accordance with this aspect of the present invention, by using the GPU as the image processing part, it is possible to perform higher-speed computations for the image processings relating to defect detection. When the computation speed for the image processings increases, more efficient image transfer is needed, and it is therefore required to reduce the effect of the overhead in the image transfer as much as possible. In other words, it is possible to produce a greater effect of suppressing the delay of inspection in the case where the GPU which can perform the image processings at higher speed is used, as compared with the case where the CPU is used in the image processing part.

Therefore, it is a first object of the present invention to provide a technique for suppressing a decrease in the transfer efficiency of an image and performing an efficient defect inspection.

Further, the present invention is intended for an appearance inspection method for detecting a defect of a pattern on the basis of an image of a surface of a substrate on which said pattern is formed, which is captured by an imaging part.

According to the present invention, the appearance inspection method comprises the steps of: (a-1) a step of transferring image data which is obtained by imaging a region to be inspected on said substrate and stored in an image storing memory by said imaging part to a plurality of image processing memories; (b-1) a step of performing inspection processes for defect detection on image data corresponding to respective regions to be processed thereby, out of transferred image data which are transferred to said image processing memories in said step (a-1); and (c-1) a step of acquiring inspection tasks each prescribing inspection details and controlling said plurality of image processing parts in accordance with said inspection tasks, respectively, independently of said step (a-1), wherein said step (b-1) being a step performed in accordance with the inspection tasks acquired in said step (c-1).

According to another aspect of the present invention, the appearance inspection apparatus comprises an inspection task holding part for holding a plurality of inspection tasks each prescribing inspection details a plurality of image processing parts for performing image processing relating to defect detection, and an image processing control parts for controlling the plurality of image processing parts, respectively, in accordance with the inspection tasks, and in the appearance inspection apparatus of the present invention, the image processing control parts sequentially cause the plurality of image processing parts, in order of completing image processing on the basis of one of the inspection tasks, to perform new image processing in accordance with a next one of the inspection tasks which are held in the inspection task holding part.

In the appearance inspection apparatus in accordance with this aspect of the present invention, since the image processing parts are caused to perform a next new image processing in order of completing an image processing, the image processing parts can always operate. Therefore, it is possible to use the processing capabilities of the plurality of image processing parts without any waste. Further, even if the individual image processing times vary in accordance with the degree of defects, it is possible to impose the load onto all the image processing parts in a good balance. Therefore, any complicated preparation is not needed prior to the inspection, and it is possible to easily ensure an increase in the inspection efficiency.

Preferably, an image data holding part for holding image data which is obtained by imaging operation of the imaging part, and an image processing memory for storing image data of a divided region which is obtained by dividing a region imaged by the imaging part, on which each of the image processing parts performs image processing, and in the appearance inspection apparatus of the present invention, the image processing control parts determine whether or not image data of the divided region to be processed by the image processing part is included in the image data which are held in the image data holding part and cause the image data of the divided region to be transferred to the image processing memory when the image data of the divided region is included.

In the appearance inspection apparatus in accordance with this aspect of the present invention, it is possible to transfer the image data in accordance with the number of detections by the line sensor (the number of lines).

Preferably, the imaging part includes a line sensor, and the image processing control parts cause the image data to be transferred to the image processing memory when image data having a predetermined number of lines is acquired and stored in the image processing memory by the imaging part.

In the appearance inspection apparatus in accordance with this aspect of the present invention, it is possible to transfer the image data in accordance with the number of detections by the line sensor (the number of lines).

Preferably, the image processing part includes a GPU (Graphics Processing Unit).

In the appearance inspection apparatus in accordance with this aspect of the present invention, by using the GPU as the image processing part, it is possible to perform higher-speed computations for the image processings relating to defect detection.

Therefore, it is a second object of the present invention to provide a technique for performing an efficient pattern defect inspection without any complicated operation.

Further, the present invention is intended for an appearance inspection method for detecting a defect of a pattern on the basis of an image of a surface of a substrate on which said pattern is formed, which is captured by an imaging part.

According to the present invention, the appearance inspection method comprises the steps of: (a-2) a step of holding a plurality of inspection tasks each prescribing inspection details; and (b-2) a step of causing each of the plurality of image processing parts to perform image processing relating to defect detection in accordance with each of said inspection tasks held in said step (a-2), wherein said step (b-2) sequentially cause said plurality of image processing parts, in order of completing image processing on the basis of one of said inspection tasks, to perform new image processing in accordance with a next one of said inspection tasks which are held in said step (a-2).

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an overall configuration diagram showing an appearance inspection apparatus in accordance with a first preferred embodiment of the present invention;

FIG. 2 is a functional block diagram showing the appearance inspection apparatus in accordance with the first preferred embodiment;

FIG. 3 is a schematic plan view showing an exemplary substrate;

FIG. 5 is an illustration showing an exemplary division of an imaging region in generation of inspection tasks;

FIG. 6 is a view showing the transfer rates of image data in different amount which are transferred from a buffer memory to an image processing memory in an image processing units;

DESCRIPTION OF THE PREFERRED EMBODIMENTS

Figure 4:
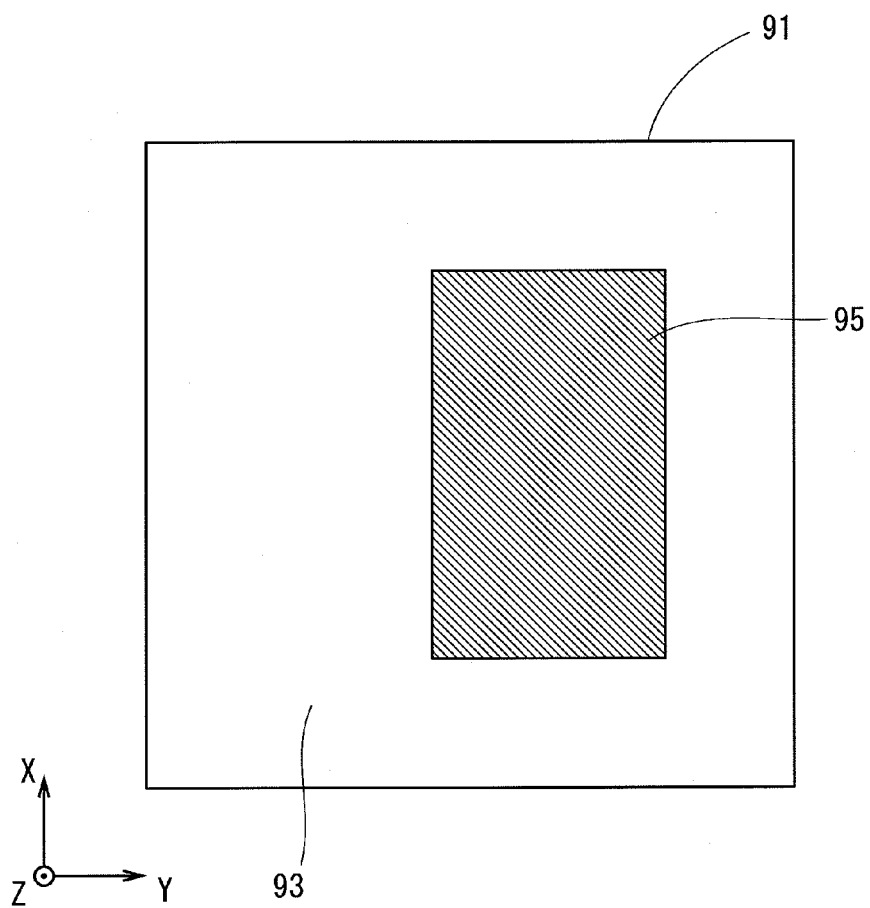
FIG. 4 is a schematic plan view showing one of dies shown in FIG. 3.

Hereinafter, with reference to figures, the preferred embodiments of the present invention will be discussed. The structures shown in the preferred embodiments are illustrative and the scope of the invention is not limited only to those structures.

<1. The First Preferred Embodiment>
<1.1. Constitution of Appearance Inspection Apparatus 1>

FIG. 1 is an overall configuration diagram showing an appearance inspection apparatus 1 in accordance with the first preferred embodiment of the present invention. FIG. 2 is a functional block diagram showing the appearance inspection apparatus 1 in accordance with the first preferred embodiment. In FIG. 1 and the following figures, for easy understanding, the size and numbers of constituent parts are sometimes exaggerated or simplified as needed. Further, in FIG. 1 and the following figures, for easy understanding of positional relations of the constituent parts, a left-handed XYZ rectangular coordinate system in which a Z-axis direction is defined as the vertical direction and an XY plane is defined as the horizontal plane is sometimes additionally shown.

The appearance inspection apparatus 1 is an apparatus for inspecting a defect of a pattern (circuit pattern or the like) foamed on a semiconductor substrate 9 (hereinafter, referred to simply as a "substrate 9") which is an object to be inspected, on the basis of an image which is captured by an imaging part 3. The appearance inspection apparatus 1 comprises a stage 2 (substrate holding part) for holding the substrate 9, a stage moving mechanism 21 for moving the stage 2 in the horizontal direction (in an X-axis direction or a Y-axis direction), the imaging part 3 for imaging a main surface on the upper side (+Z side) in the vertical direction (hereinafter, referred to as an "upper surface") of the substrate 9, a control part 4 for controlling respective operations of the constituent elements, such as the stage 2 and the like in the appearance inspection apparatus 1, an inspection part 5 for performing defect detection of a pattern on the basis of the image captured by the imaging part 3, and a defect data processing part 6 for processing defect data acquired by the inspection part 5.

The stage moving mechanism 21 comprises a Y-direction moving mechanism 22 for moving the stage 2 in the Y-axis direction, an X-direction moving mechanism 23 for moving the stage 2 in the X-axis direction, and a stage up-and-down moving mechanism 24 for moving the stage 2 in the Z-axis direction to perform focusing. The Y-direction moving mechanism 22 has a ball screw (not shown) connected to a motor 221 and a nut member (not shown) to be engaged with a ball screw fixed to the X-direction moving mechanism 23. With rotation of the motor 221, the X-direction moving mechanism 23 moves in the Y-axis direction along a guide rail 222. The X-direction moving mechanism 23 also has the same structure as the Y-direction moving mechanism 22 has, and rotates a not-shown ball screw by using a motor 231, to thereby move the stage 2 in the X-axis direction along a pair of guide rails 232. Besides the structure using the ball screws like in the first preferred embodiment, the stage moving mechanism 21 may have a structure using a direct-acting mechanism such as a linear motor or the like.

The substrate 9 is fixed by suction onto an upper surface of the stage 2 during the inspection. For this reason, when the stage moving mechanism 21 moves the stage 2 in the X-axis direction or the Y-axis direction, the substrate 9 can be moved relatively to the imaging part 3. In the appearance inspection apparatus 1, the substrate 9 is moved in the X-axis direction or the Y-axis direction and irradiated with visible light in two-dimensional or line irradiation from a not-shown irradiation part such as a halogen lamp, an LED, or the like. Then, a reflected light which is reflected from the substrate 9 is detected by a detector (herein, the line sensor 31) included in the imaging part 3. Instead of the visible light, ultraviolet light or infrared light may be emitted. Further, a light source which emits electron beams or laser beams may be used.

While the stage moving mechanism 21 moves the stage 2 and the substrate 9 is thereby moved relatively to the imaging part 3 in the XY plane in the first preferred embodiment, the imaging part 3 may be moved with the stage 2 fixed. As a matter of course, both the stage 2 and the imaging part 3 may be moved individually. In other words, the appearance inspection apparatus 1 may have any structure only if the substrate 9 can be moved relatively to the imaging part 3.

The imaging part 3 comprises the line sensor 31. The line sensor 31 has a structure in which a plurality of detecting elements which can detect the electron beams or the laser beams emitted on the substrate 9 are aligned. A detection signal detected by the line sensor 31 is converted into digital data by a not-shown A/D converter as appropriate, and the digital data is subjected to predetermined processing such as correction or the like and sequentially transmitted to a buffer memory 53 in the inspection part 5 as an image signal. The buffer memory 53 is an example of an image storing memory. Instead of the line sensor 31, an area sensor such as a CCD or the like may be used.

The control part 4 has a constitution of general computer comprising a CPU (Central Processing Unit) and a RAM (Random Access Memory). An inspection recipe creation part 41, an inspection task generation part 43, and a stage control part 45 which are shown in FIG. 2 are functional blocks which are implemented by software when the CPU operates in accordance with a program. Some or all of these functions may be implemented by hardware, using dedicated circuits.

In order for an operator to determine the details of inspection to be performed in the appearance inspection apparatus 1, the inspection recipe creation part 41 provides a GUI (Graphical User Interface) used for producing an inspection recipe. The inspection recipe is an inspection condition which is given by the operator prior to the inspection. The operator sets inspection conditions (e.g., an inspection range, an inspection method, parameters to be used for the inspection, and the like) through an operation part 49. The inspection parameters include, for example, a set value of a filter for noise removal on the image, a set value (e.g., a density value of a pixel) serving as a threshold value for determining a pattern defect, and the like.

The inspection task generation part 43 generates inspection tasks on the basis of the inspection recipe created by the inspection recipe creation part 41. The inspection task is a unit of inspection process performed by an image processing unit 59 described later. The inspection task includes, for example, coordinate information of a portion to be inspected by each image processing unit 59 described later, an inspection type (a die-to-die comparison inspection, a cell-to-cell comparison inspection, or the like which will be described later), or inspection parameters used for each inspection.

The stage control part 45 controls the driving of the motor 221 or 231 to control the amount of movement, the movement speed and the like of the stage 2 in the X-axis direction or the Y-axis direction. The stage control part 45 controls the movement of the stage 2 so that a specific region on the substrate 9 specified by the inspection recipe can be imaged.

To the control part 4, connected are a display part 47 formed of a liquid crystal monitor or the like which displays various information and an operation part 49 formed of a mouse, a keyboard, or the like used for inputting various information to the control part 4 by the operator. If the display part 47 is formed of a touch panel, the display part 47 can also have some or all of the functions of the operation part 49. On the basis of the information displayed on the display part 47, various instructions can be inputted through the operation part 49 to the control part 4. The inspection part 5, like the control part 4, has a constitution of general computer comprising a CPU, a RAM, and the like and performs various computations relating to the pattern defect detection. The inspection part 5 comprises an inspection task holding part 51, the buffer memory 53, and an image transfer part 55. The inspection part 5 further comprises a plurality of GPU control parts 57 and a plurality of image processing units 59 whose operations are controlled by the plurality of GPU control parts 57, respectively. The image transfer part 55 and the GPU control parts 57 are functional blocks which are implemented by software when the CPU operates in accordance with a not-shown program. The control part 4 and the inspection part 5 are formed of two computers connected to each other via a communication line such as LAN or the like but may be formed of one computer.

The inspection task holding part 51 is formed of a storage part (including one for temporarily storing information, such as a RAM or the like) for storing the inspection tasks generated by the inspection task generation part 43 and has a first-in-first-out data structure. The plurality of GPU control parts 57 make accesses to the inspection task holding part 51 asynchronously and exclusively and thereby each acquire one of a plurality of inspection tasks in series.

The buffer memory 53 is a storage part for storing image signals (image data), one by one, which are based on the detection signals which are sequentially detected by the line sensor 31, as discussed above. The image signals accumulated in the buffer memory 53 become image data in the amount in accordance with the number of detections by the line sensor 31 (in other words, the number of lines). The buffer memory 53 is an example of an image data holding part.

The image transfer part 55 transfers the image data stored in the buffer memory 53 to the image processing units 59, respectively. The image transfer part 55 is configured to automatically transfer the image data when the amount of image data stored in the buffer memory 53 reaches a predetermined amount of data.

Specifically, it is assumed, for example, that the line sensor 31 has 8192 detecting elements and the amount of information per one pixel corresponding to each detecting element is one byte (=8 bits or 256 tone levels), and the image transfer part 55 is configured to transfer the image data every time when the line sensor 31 scans 1024 lines. Then, in this case, the image transfer part 55 transfers the image data in the amount of about 8 MB (=8192×1024) in one transfer operation. By transferring the image data in such a relatively large unit, the time of indirect or additional operation (overhead) occurring in the transfer operation can be made relatively small. Therefore, the decrease in the transfer efficiency can be suppressed, and this ensures an increase in the inspection efficiency.

Each of the GPU control parts 57 has a function for controlling a GPU 591 included in the corresponding image processing unit 59. The GPU control part 57 makes access to the inspection task holding part 51 to acquire an inspection task and causes the corresponding GPU 591 to operate in accordance with the instruction described in the inspection task. As discussed above, since the inspection task describes information on the coordinate position of a region to be processed, the inspection type (a die-to-die comparison inspection, a cell-to-cell comparison inspection, or the like), the inspection parameters, or the like, the GPU control part 57 interprets the inspection information and causes the corresponding GPU 591 to perform image processing in accordance with the contents.

Each of the image processing units 59 comprises the GPU 591 and an image processing memory 593. The image processing unit 59 is formed of, e.g., a video card (graphic card), and the image processing unit 59 is connected to the image transfer part 55 or the corresponding GPU control part 57 in a communicable manner through a serial bus of PCI Express standard, or the like.

As the GPU 591, for example, a GPGPU (General Purpose Computing on Graphics Processing Unit) provided by NVIDIA Corporation in USA or the like may be used. The GPU 591 has a plurality of programmable shaders (each of which is a code of a program (software) for computing how a 3D model is viewed on the basis of the 3D model defined in 3D graphics and information on a light source, and hardware for performing the computation, which perform programmable operations). The programmable shaders operate in accordance with a predetermined program, and the GPU 591 can thereby perform highly parallel computation on pattern defect detection. In the development of the program for operating the programmable shaders, various development environments such as CUDA (Compute Unified Device Architecture) provided by NVIDIA Corporation in USA, OpenCL, or the like may be used. The GPU 591 is an example of an image processing part.

The image processing memory 593 is a storage part providing a region in which the GPU 591 operates. As the image processing memory 593, for example, a memory of GDDR (Graphics Double Data Rate) standard which is suitable for graphics processing, which is mounted on a general video card, may be used. In the first preferred embodiment, as discussed above, the image processing memory 593 not only provides a region used for the operation of the GPU 591 but also stores the whole image data which is obtained by imaging operation of the imaging part 3 and transferred by the image transfer part 55. Therefore, it is desirable that the image processing memory 593 should have a relatively large capacity of about several hundreds MB to several GB. Many of the video cards which have been on the market in recent years are each equipped with a video memory of several GB and each have a capacity sufficient to be used as the image processing memory 593.

The defect data processing part 6 shown in FIG. 1 collects information of the defects detected by the image processing units 59 and stores the inspection result into a not-shown storage part (including one for temporarily storing information, such as a RAM or the like). Specifically, the defect information includes coordinate information of a position in which a pattern defect is detected, information on the area of a defective portion, the density value of a defective pixel, or the like. As a matter of course, the defect information is not limited to these information. The defect data processing part 6 may be formed of one computer comprising a CPU and a RAM, but the control part 4 or the inspection part 5 may also have the function of the defect data processing part 6.

<1.2. Inspection of Pattern Defects>

When the appearance inspection apparatus 1 starts the inspection, first, the inspection recipe creation part 41 creates an inspection recipe on the basis of the operation input by the operator. In order to produce the inspection recipe, the operator specifies various inspection conditions such as arrangement of dies, an inspection range, an inspection method to be applied, and the like. The inspection task generation part 43 generates inspection tasks on the basis of the inspection recipe which is created. The inspection tasks which are generated are stored in the inspection task holding part 51. The appearance inspection apparatus 1 uses the stage control part 45 to move the stage 2 in accordance with the inspection recipe and uses the imaging part 3 to image the inspection range.

FIG. 3 is a schematic plan view showing an exemplary substrate 9. The substrate 9 shown in FIG. 3 is a circular semiconductor wafer and a plurality of dies 91 are formed on a surface thereof. An imaging region 300 shown in FIG. 3 shows a region that the line sensor 31 images by scanning along the Y-axis direction.

FIG. 4 is a schematic plan view showing one of the dies 91 shown in FIG. 3. The die 91 shown in FIG. 4 mixedly includes a region with low repeatability of a circuit pattern in one region (hereinafter, referred to as a "non-repeating pattern region 93") and a region with repeatability of a circuit pattern in one region (hereinafter, referred to as a "repeating pattern region 95").

FIG. 5 is an illustration showing an exemplary division of the imaging region 300 in generation of the inspection tasks. FIG. 5 shows an exemplary case where the imaging region 300 exists across the non-repeating pattern region 93 and the repeating pattern region 95 in a specific die 91.

As shown in FIG. 5, when the inspection task generation part 43 generates the inspection tasks, the imaging region 300 is divided into a plurality of partial regions (herein, divided regions 70a to 70d). Specifically, the inspection task generation part 43 first divides the imaging region 300 into a region (herein, including the divided regions 70a, 70b, and 70c) corresponding to the non-repeating pattern region 93 and a region (herein, the divided region 70d) corresponding to the repeating pattern region 95. Then, the inspection task generation part 43 further divides these regions into rectangular regions. The rectangular divided regions 70a to 70d are thereby set as individual regions to be inspected. The method of dividing the imaging region 300 is, however, not limited to the above one but various methods may be used. For example, the inspection task generation part 43 may divide the imaging region 300 into regions having any shapes and the same size and sets the regions as divided regions.

The respective coordinate information of the divided regions 70a to 70d which are divided thus are registered in the inspection tasks. The information on respective inspection types for defect detection to be applied to the divided regions 70a to 70d are also registered in the inspection tasks.

For example, since the divided regions 70a to 70c are each a non-repeating pattern region 93, a die-to-die comparison inspection is applied to these regions. The die-to-die comparison inspection refers to an inspection method of detecting a pattern defect by comparison between two adjacent dies 91 and 91 in a direction parallel to the longitudinal direction of the line sensor 31.

The divided region 70d is a repeating pattern region 95, and the same circuit pattern is repeatedly found in the divided region 70d. Then, a cell-to-cell comparison inspection is applied to the divided region 70d. The cell-to-cell comparison inspection refers to an inspection method of detecting a pattern defect by comparison between adjacent repeated patterns.

Thus, the inspection type is determined depending on whether each of the divided regions 70a to 70d is corresponding to the non-repeating pattern region 93 or the repeating pattern region 95 and registered in the inspection task.

The inspection task generation part 43 rearranges the plurality of generated inspection tasks in accordance with the scan direction of the imaging part 3 and stores the rearranged inspection tasks into the inspection task holding part 51. In other words, the right of execution is allocated to the plurality of inspection tasks (queuing) so that the region which is scanned earlier by the imaging part 3 can be processed earlier by the image processing unit 59. It is thereby possible to efficiently perform the inspection of the imaging region 300 scanned by the imaging part 3.

The imaging part 3 stores the image data which is obtained by imaging into the buffer memory 53. When a predetermined amount of image data is stored in the buffer memory 53, the image transfer part 55 transfers the image data stored in the buffer memory 53 to the respective image processing memories 593 included in the plurality of image processing units 59. Asynchronously with (independently of) the image transfer by the image transfer part 55, the plurality of GPU control parts 57 each make access to the inspection task holding part 51 to acquire one inspection task.

Each of the GPU control parts 57 first determines whether or not the image data of the region (divided region) to be inspected by the image processing unit 59 which is controlled by the GPU control part 57 is included in the image data (herein, the number of transferred lines) transferred to the image processing memory 593 of the corresponding image processing unit 59 (determination on the transferred data) on the basis of the acquired inspection task. When the image data of the divided region to be inspected by the corresponding image processing unit 59 is included in the transferred image data, the GPU control part 57 gives an inspection parameter to the corresponding GPU 591 and causes the GPU 591 to perform the inspection of the type which is registered in the inspection task. On the other hand, when the image data of the divided region to be inspected by the corresponding image processing unit 59 is not included in the transferred image data, the GPU control part 57 causes the corresponding GPU 591 to wait until the image data of the region to be inspected is transferred.

In order to perform the above determination on the transferred data, every time when the image data is transferred to each of the image processing units 59, the image transfer part 55 may notify the corresponding GPU control part 57 of the information on the image data transferred to the image processing unit 59. Alternatively, each of the GPU control parts 57 may inquire the image transfer part 55 about the transferred data when the GPU control part 57 performs the determination on the transferred image data. In the latter case, it becomes easier to manage the information on the transferred image data. Therefore, even if the number of GPU control parts 57 increases, it is possible to easily deal with the increase of the GPU control parts 57 by additionally providing the image processing unit 59.

When the GPU 591 receives the instruction for the inspection from the corresponding GPU control part 57, the GPU 591 makes access to the corresponding image processing memory 593 to take out the image data of the divided region to be inspected and the image data of a reference region therefrom. Then, the GPU 591 performs predetermined image processing such as noise removal, contrast adjustment, or the like on the image data of the divided region to be inspected and that of the reference region and then performs comparison therebetween for pattern defect detection. The comparison is not limited particularly. For example, whether there is a defect or not may be determined by binarizing the difference between the density values of the compared pixels with a threshold value. Further, on the basis of the result of the pixel comparison between the images which are monochromated by binarizing, the difference portion (pattern defect) may be extracted. Furthermore, respective edges of the images are extracted, and on the basis of the result of comparison in the shape of the extracted edges, the difference portion may be extracted. The GPU 591 writes the result of defect information acquired by any one of such processings into the corresponding image processing memory 593 as appropriate.

When the inspection by the GPU 591 is completed, the GPU control part 57 transfers the defect information stored in the image processing memory 593 to the defect data processing part 6. Then, the GPU control part 57 makes access to the inspection task holding part 51 again to acquire another inspection task. Thus, the inspection part 5 uses the plurality of image processing units 59 to parallelly perform all the inspection tasks stored in the inspection task holding part 51.

The defect data processing part 6 collects the defect information such as the respective coordinate information of the pattern defects the images cut as a defect portions, the information on the respective areas of the defective portions, the respective density values of the defective pixels, or the like extracted by the plurality of image processing units 59 and stores the defect information into the storage part. At that time, the defects may be classified by type (for example, pattern abnormality due to deposition of foreign materials or abnormality of pattern formation such as missing circuit elements). Further, when a plurality of one-type pattern defects are found across a plurality of scan images, the defect data processing part 6 may perform a process (merging) for forming one image including the whole of defective portions by merging these scan images.

<1.3. Effects>

In the appearance inspection apparatus 1 of the first preferred embodiment, the image transfer part 55 sequentially transfers the image data which are obtained by imaging the regions to be inspected and stored in the buffer memory 53 by the imaging part 3 to the plurality of image processing units 59. On the other hand, each of the GPU control parts 57 acquires the inspection task and causes the corresponding image processing unit 59 to perform the inspection process on the basis of the acquired inspection task independently of the transfer of the image data by the image transfer part 55. Therefore, it is possible to set the amount of image data to be transferred by the image transfer part 55 in one operation to a relatively large amount. The time of overhead for communication occurring in the data transfer can be thereby made relatively small, and this ensures an increase in the inspection efficiency.

FIG. 6 is a view showing the transfer rates of image data in different amount which are transferred from the buffer memory 53 to the image processing units 59. In FIG. 6, the horizontal axis represents the capacity of data transferred by the image transfer part 55 in one operation and the vertical axis represents the transfer rate. In the exemplary case shown in FIG. 6, it is hard to cause a decrease in the transfer rate when the capacity of data transferred in one operation is 1 MB or more while the transfer rate significantly decreases when the data capacity is less than 1 MB. Therefore, by setting the amount of data to be transferred by the image transfer part 55 in one operation to the amount larger than 1 MB (the data amount which causes a decrease in the transfer rate), it is possible to perform data transfer with high efficiency.

Figure 7:
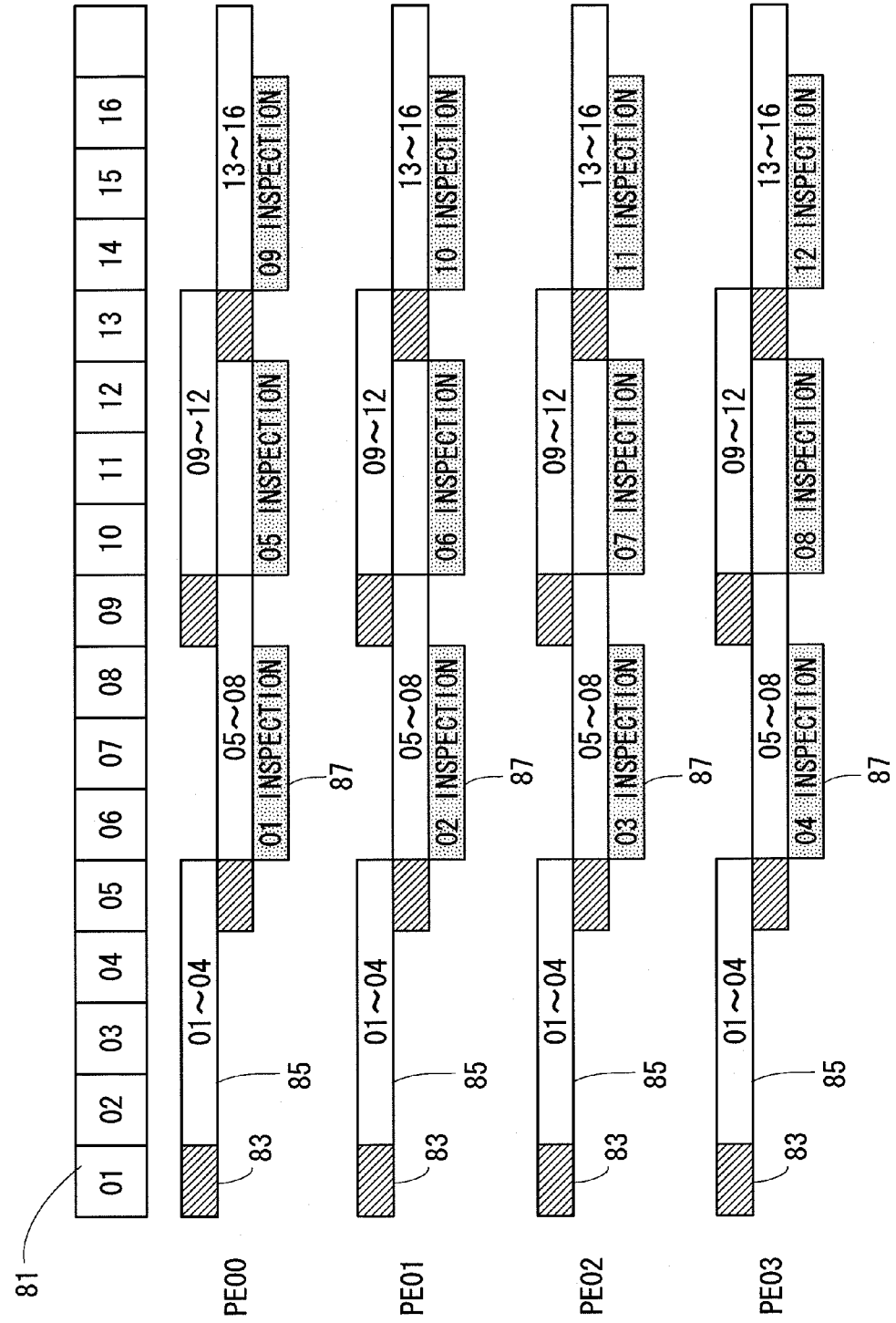
FIG. 7 is a view showing operation sequences of a plurality of image processing units.

FIG. 7 is a view showing operation sequences of the plurality of image processing units 59. In FIG. 7, a plurality of blocks 81 arranged uppermost each indicate the time where the imaging part 3 performs scanning. Each of the numbers "01" to "16" in the blocks 81 corresponds to a divided region specified by one inspection task. Specifically, in the exemplary case of FIG. 7, the plurality of blocks 81 indicate the scan imaging times for 16 divided regions, respectively. Reference signs PE00 to PE03 correspond to four image processing units 59, respectively.

In FIG. 7, hatched blocks 83 each correspond to the time of overhead occurring in one data transfer by the image transfer part 55 and white blocks 85 each correspond to the transfer time of the image data in one data transfer. Dot blocks 87 each correspond to the time required of the GPU 591 to perform an inspection process specified by one inspection task. The numbers "01" to "16" written in the blocks 81 correspond to the numbers written in the blocks 85 and 87, respectively.

In the appearance inspection apparatus 1, as shown in the blocks 85 (for example, the blocks 85 with "01-04"), the image data (for example, image data corresponding to the divided regions "01" to "04") accumulated in the buffer memory 53 are transferred to all the image processing units 59 (PE00 to PE04) at the same timing. Then, as shown in the blocks 87, in the image processing units 59 (PE00 to PE04), the inspection processes for the different divided regions are performed parallelly. Accordingly, in the appearance inspection apparatus 1, since the inspection process and the transfer of the image data are performed independently of each other, it is possible to perform the inspection process and the data transfer overlappingly in terms of time. Therefore, when the transfer of the image data to be inspected by one of the image processing units 59 is already completed, the image processing unit 59 can perform the inspection process instantly, and it is thereby possible to perform efficient inspection.

<2. The Second Preferred Embodiment>

<2.1. Constitution of Appearance Inspection Apparatus 1A>

Figure 8:
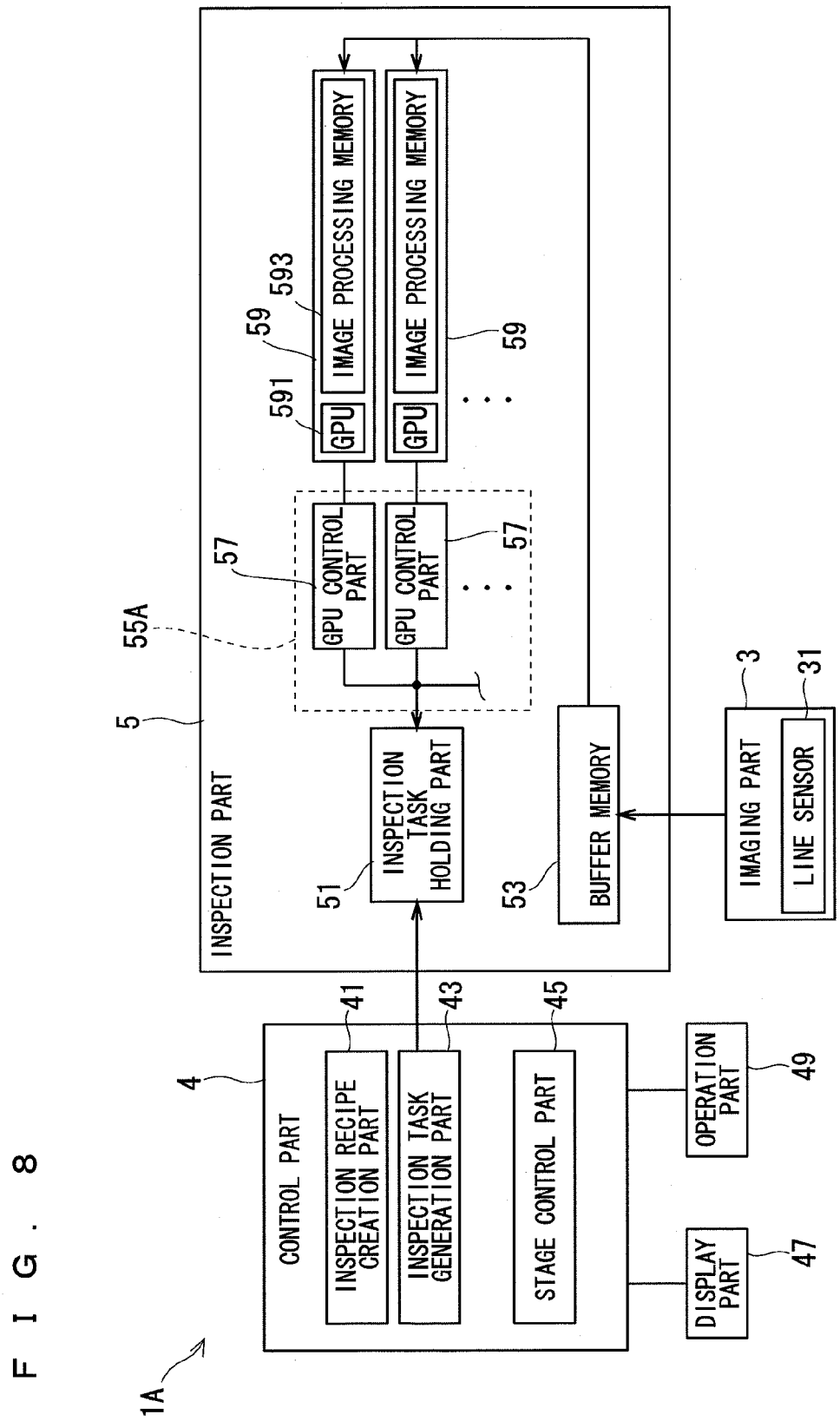
FIG. 8 is a functional block diagram showing an appearance inspection apparatus in accordance with a second preferred embodiment of the present invention.

Next, discussion will be made on an appearance inspection apparatus 1A in accordance with the second preferred embodiment of the present invention. FIG. 8 is a functional block diagram showing the appearance inspection apparatus 1A in accordance with the second preferred embodiment.

The inspection part 5 of the second preferred embodiment comprises the inspection task holding part 51, the buffer memory 53, and an image processing control part 55A. The image processing control part 55A includes the plurality of GPU control parts 57. The inspection part 5 further comprises the plurality of image processing units 59 whose operations are controlled by the plurality of GPU control parts 57, respectively. The image processing control part 55A is a functional block which is implemented by software when the CPU operates in accordance with a not-shown program.

In the second preferred embodiment, the image processing control part 55A makes access to the inspection task holding part 51 (specifically, the plurality of GPU control parts 57 make accesses to the inspection task holding part 51 asynchronously and exclusively). Then, from the inspection task holding part 51, one of the plurality of inspection tasks which are arranged in a predetermined order is taken out as appropriate.

The image processing control part 55A causes the plurality of image processing units 59 in order of completing image processing on the basis of one inspection task to sequentially perform new image processing in accordance with a next new inspection task which is held in the inspection task holding part 51. Therefore, an instruction of image processing in accordance with the new inspection task is given to any one of the image processing units 59 which completes the image processing, one after another. Thus, in the appearance inspection apparatus 1A, it is not determined in advance which image processing unit 59 should execute one of the plurality of inspection tasks. Therefore, in the appearance inspection apparatus 1A, the image processing unit 59 which is to perform one of the plurality of inspection tasks is determined sequentially after the inspection is actually started.

Further, in the second preferred embodiment, each of the image processing units 59 is connected to the buffer memory 53 or the corresponding GPU control part 57 in a communicable manner through a serial bus of PCI Express standard, or the like.

<2.2. Inspection of Pattern Defects>

Like the appearance inspection apparatus 1 of the first preferred embodiment, the appearance inspection apparatus 1A of the second preferred embodiment creates an inspection recipe. Specifically, as shown in FIG. 5, when the inspection task generation part 43 generates the inspection tasks, the imaging region 300 is divided into a plurality of partial regions (herein, divided regions 70a to 70d). Then, the inspection type is determined depending on whether each of the divided regions 70a to 70d is corresponding to the non-repeating pattern region 93 or the repeating pattern region 95 and registered in the inspection task.

After that, the inspection task generation part 43 rearranges the plurality of generated inspection tasks in accordance with the scan direction of the imaging part 3 and stores the rearranged inspection tasks into the inspection task holding part 51. In other words, the right of execution is allocated to the plurality of inspection tasks (queuing) so that the region which is scanned earlier by the imaging part 3 can be processed earlier by the image processing unit 59. The image processing control part 55A (specifically, the plurality of GPU control parts 57) acquires the inspection tasks in order of being queued. For this reason, the divided regions to be inspected are subjected to the image processing in the GPUs 591 in order of being imaged. Therefore, the inspection part 5 can efficiently perform the inspection of the imaging region 300 scanned by the imaging part 3.

The imaging part 3 sequentially stores the image data which is obtained by imaging operation of the line sensor 31 into the buffer memory 53. On the other hand, the plurality of GPU control parts 57 included in the image processing control part 55A make access to the inspection task holding part 51 asynchronously and exclusively to each acquire one inspection task so as to cause the image processing units 59, respectively, to perform the image processing relating to the defect inspection.

Each of the GPU control parts 57 first determines whether or not the image data of the divided region (for example, the divided region 70a, 70b, 70c, or 70d shown in FIG. 5) to be inspected, which is specified in the inspection task is already imaged and stored in the buffer memory 53 (determination on the captured image data) on the basis of the acquired inspection task. Specifically, the number of lines taken in the buffer memory 53 is compared with the number of lines corresponding to the divided region. When the number of lines taken in the buffer memory 53 is larger (in other words, the image data of the divided region is included in the captured image data), the GPU control part 57 transfers the image data of the divided region to the corresponding image processing memory 593. Then, the GPU control part 57 gives an inspection parameter to the corresponding GPU 591 and causes the GPU 591 to perform the image processing relating to the inspection of the type which is registered in the inspection task.

On the other hand, when the number of lines taken in the buffer memory 53 is smaller than the number of lines corresponding to the divided region (in other words, the image data of the divided region is not included in the captured image data), the GPU control part 57 causes the corresponding GPU 591 to wait until the divided region to be inspected is imaged.

In order to perform the above determination on the captured image data, there may be a case where the imaging part 3 stores the information on the number of lines taken in the buffer memory 53 into the buffer memory 53 and the GPU control part 57 refers to this information as appropriate. Further, the imaging part 3 may notify the image processing control part 55A of the information on the number of lines taken in the buffer memory 53 as appropriate.

When the GPU 591 receives an instruction to start the inspection process from the corresponding GPU control part 57, the GPU 591 makes access to the corresponding image processing memory 593 to taken out the image data of the divided region to be inspected and the image data of a reference region therefrom and performs comparison for pattern defect detection. This comparison process is performed as discussed above. The GPU 591 writes the result of the defect information acquired by this operation into the corresponding image processing memory 593 as appropriate.

<2.3. Effects>

Figure 9:
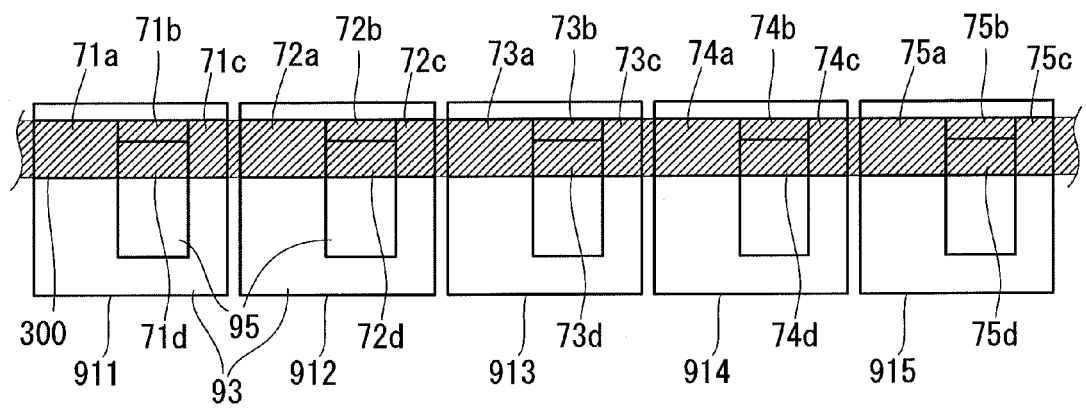
FIG. 9 is a view showing a scan performed across a plurality of dies.

FIG. 9 is a view showing a scan across a plurality of dies 911 to 915. In FIG. 9, the dies 911 to 915 are the same chip as the die 91 and each have the non-repeating pattern region 93 and the repeating pattern region 95. In the exemplary case of FIG. 9, the imaging region 300 is divided into the divided regions 71a to 71d, 72a to 72d, 73a to 73d, 74a to 74d, and 75a to 75d. The inspection tasks are individually set for these divided regions.

Figure 10:
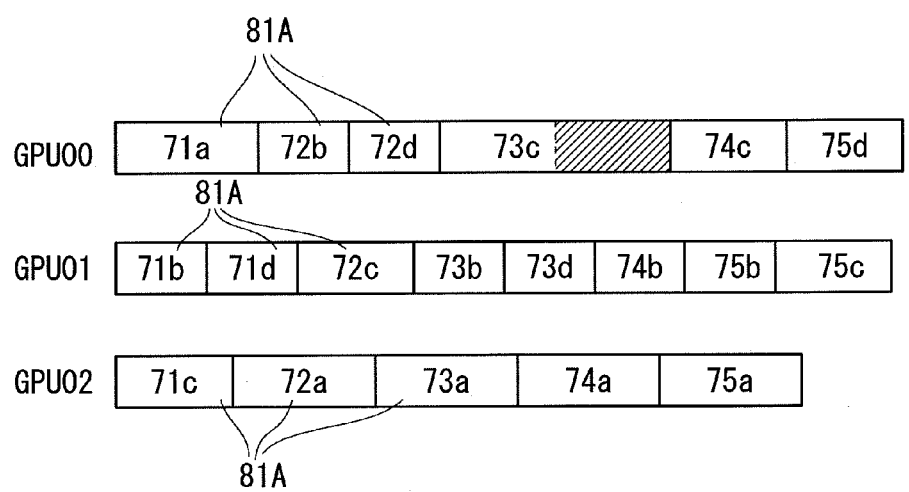
FIG. 10 is a view showing operation sequences of a plurality of GPUs.

FIG. 10 is a view showing operation sequences of the plurality of GPUs 591. In FIG. 10, reference signs GPU00, GPU01, and GPU02 correspond to three GPUs 591, respectively. The blocks 81A correspond to image processings performed by the GPUs GPU00, GPU01, and GPU02 on the divided region image data shown in FIG. 9, respectively, and the respective widths of the blocks 81A correspond to the lengths of the processing times required for the image processings. The characters written in the blocks 81A correspond to the divided regions 71a to 71d, 72a to 72d, 73a to 73d, 74a to 74d, and 75a to 75d shown in FIG. 9, respectively. For example, the block 81A with "71a" corresponds to the image processing on the divided region 71a.

As shown in FIG. 10, when any one of the GPUs 591 (any one of GPU00, GPU01, and GPU02) completes one image processing, the corresponding GPU control part 57 acquires a next inspection task from the inspection task holding part 51 and causes the GPU 591 to perform the inspection process in accordance with the next inspection task. For this reason, all the GPUs 591 continues to perform the inspection process at all times without stopping until the inspection task holding part 51 has no inspection task.

Herein, consider a case, for example, where one inspection process takes longer processing time than usual. It is assumed, as a specific case, that the image processing on the divided region 73c takes longer processing time than usual as indicated by hatching in FIG. 10 due to occurrence of many defects in the divided region.

In the case where the inspection process performed by each of the image processing parts (which correspond to the GPUs 591 of the second preferred embodiment of the present invention) is determined in advance, like in the case of using the appearance inspection apparatus disclosed in Japanese Patent Application Laid Open Gazette No. 2011-028410, each of the GPUs 591 can perform only the inspection tasks which are allocated thereto in advance. For this reason, if the processing time of one GPU 591 is prolonged, the completion time of all the inspection processes allocated to the GPU 591 is also delayed by the prolongation. Since the completion time of all the inspection tasks is the time when all the GPUs 591 complete respective allocated processes, if the processing time of one GPU 591 is prolonged, the completion time of all the processes is disadvantageously prolonged.

On the other hand, in the appearance inspection apparatus 1A of the second preferred embodiment, if the processing time of one GPU 591 is prolonged, the other GPUs 591 perform the next inspection tasks one after another. In other words, the other GPUs 591 can compensate the delay of the one GPU 591. As a result, since the loads imposed on all the GPUs 591 can maintain a good balance, it is possible to reduce the completion time of all the inspection tasks.

Further, the appearance inspection apparatus 1A of the second preferred embodiment does not need such a complicated preparation of allocating the inspection processes to the GPUs 591 prior to the inspection as the appearance inspection apparatus disclosed in Japanese Patent Application Laid Open Gazette No. 2011-028410 needs. Furthermore, it is possible to easily deal with the increase of the GPUs 591 (in other words, the increase in the number of threads in the parallel processing).

Thus, since the appearance inspection apparatus 1A of the second preferred embodiment causes the GPUs 591 to sequentially perform a next new image processing in order of completing one image processing, the GPUs 591 always operate. Therefore, it is possible to make the most of the processing capabilities of the plurality of GPUs 591 without any waste. Further, even if the respective times required of the GPUs 591 to perform the image processings vary in accordance with the degree of defects, it is possible to impose the load onto all the GPUs 591 in a good balance. In other words, it is possible to flexibly deal with the increase in the processing time for each inspection task, and this ensures an increase in the inspection efficiency.

Figure 11:
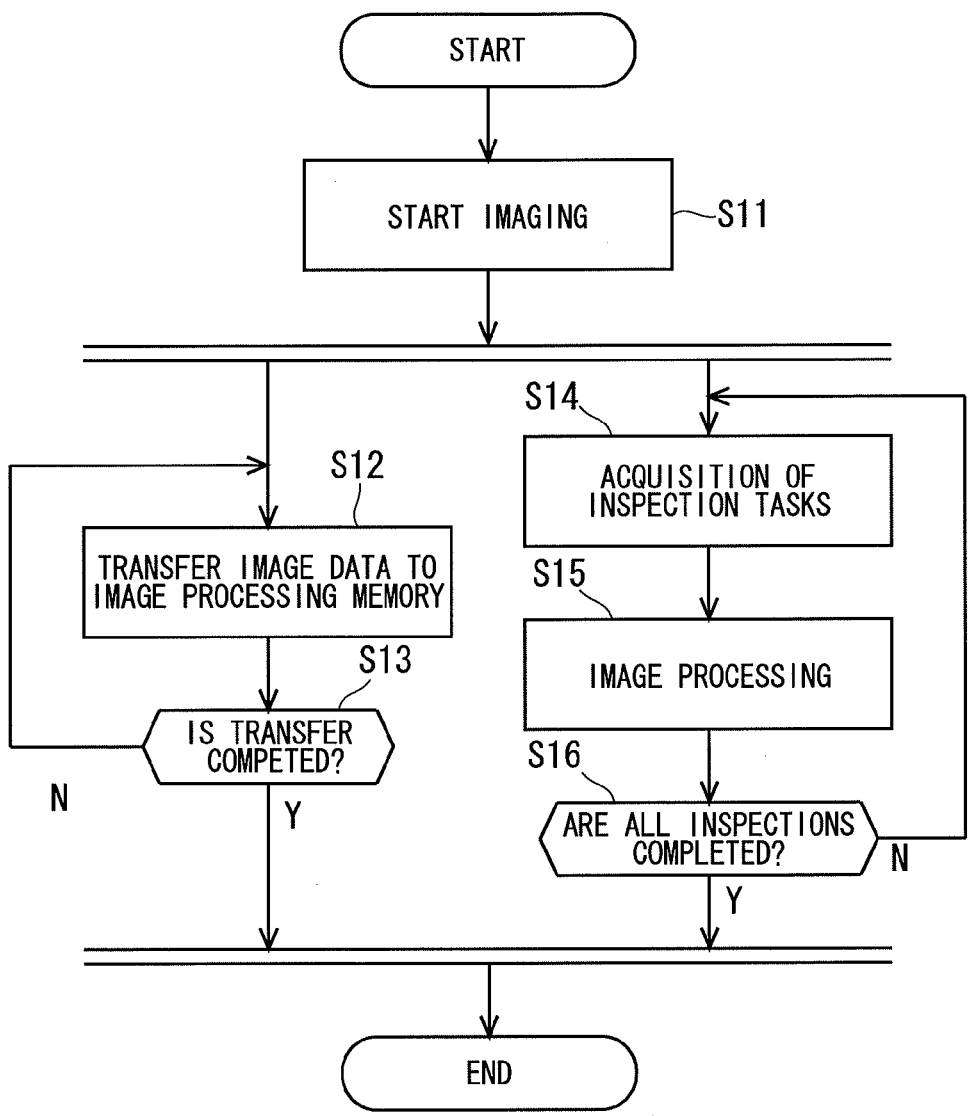
FIG. 11 is a flowchart showing operation of the appearance inspection apparatus in accordance with the first preferred embodiment of the present invention.

FIG. 11 is a flowchart showing operation of the appearance inspection apparatus 1 in accordance with the first preferred embodiment of the present invention. Although detailed explanation is omitted since the explanation will overlap, as shown in FIG. 11, when the imaging by the imaging part 3 is started (step S11), a process relating to the transfer of the image data (steps S12, and S13), and a process relating to the inspection by each of the image processing units 59 (steps S14, S15, and S16) are performed independently of each other.

The process relating to the transfer of the image data comprises a step of transferring the image data from the buffer memory 53 to the respective image processing memories 593 (step S12) and a step of determining whether or not the transfer of all of the image data are completed (step S13). Further, the process relating to the inspection by each of the image processing units 59 comprises a step of acquiring the inspection tasks (step S14), a step in which the GPU 591 performs image processing (step 15), and a step of determining whether or not all of the inspections are completed (step S16).

Figure 12:
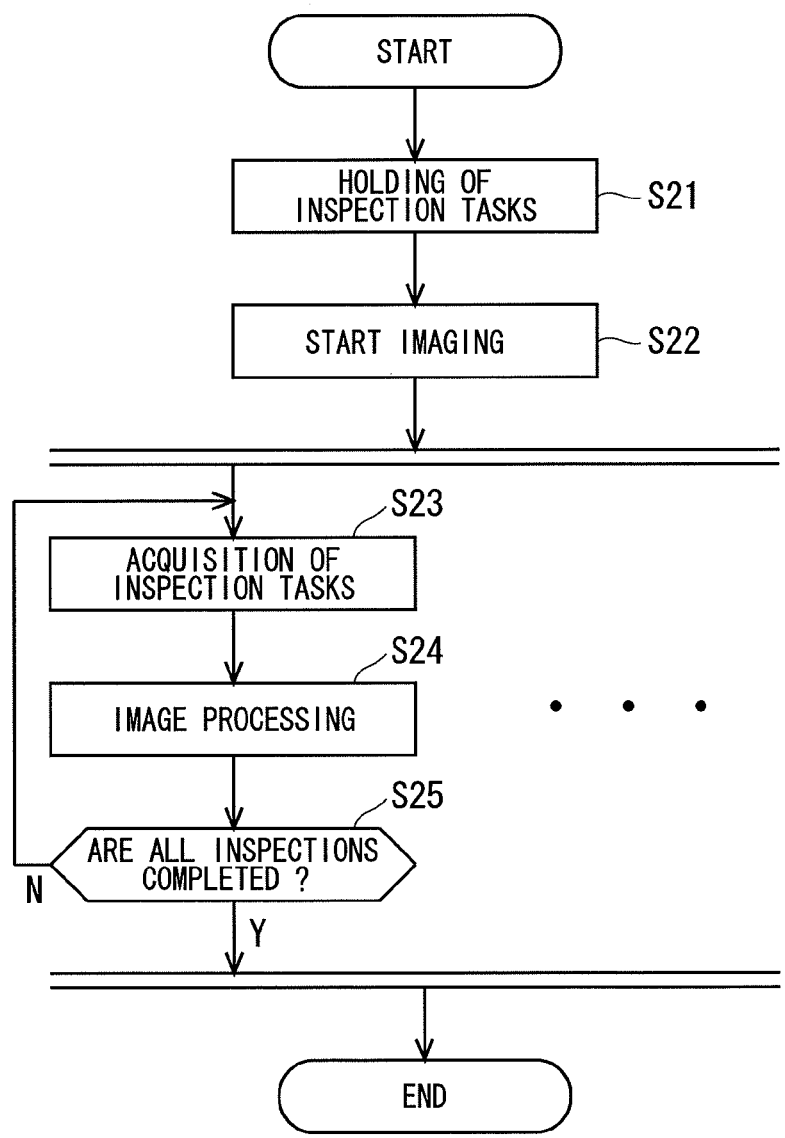
FIG. 12 is a flowchart showing operation of the appearance inspection apparatus in accordance with the second preferred embodiment of the present invention.

FIG. 12 is a flowchart showing operation of the appearance inspection apparatus 1A in accordance with the second preferred embodiment of the present invention. Although detailed explanation is omitted since the explanation will overlap, as shown in FIG. 12, the inspection tasks are held in the inspection task holding part 51 (step S21). Then, when the imaging by the imaging part 3 is started (step S22), processes relating to the inspection (step S23, S24, and S25) are performed parallelly in each of the respective image processing units 59. In FIG. 12, only a flow of the process of the inspection by one image processing unit 59 (Steps S23-S25) is shown.

The process relating to the inspection by the image processing unit 59 comprises, specifically, a step of acquiring the inspection tasks from the inspection task holding part 51 (step S23), a step in which the GPU 591 performs image processing (step S24), and a step of determining whether or not all of the inspections are completed (step S25).

<3. Variations>

Though the preferred embodiments of the present invention have been discussed above, the present invention is not limited to the above-discussed preferred embodiments, but allows various variations.

Though the inspection processes are performed parallelly by using the plurality of GPUs 591 in the above-discussed preferred embodiments, a plurality of CPUs, for example, may perform the inspection processes instead of the GPUs 591. In this case, for example, a plurality of computers each comprising a CPU and a RAM have only to be prepared so that the CPU may perform the function of the GPU 591 and the RAM may perform the function of the image processing memory 593. Multi CPUs that are a plurality of CPUs mounted on one computer may be used. In general, however, use of the GPUs 591 can achieve higher-speed computations for the image processings relating to defect detection as compared with use of the CPUs. When the computation speed for the image processings increases, more efficient image transfer is needed, and it is therefore required to reduce the effect of the overhead in the image transfer as much as possible. In other words, it is possible to produce a greater effect of suppressing the delay of inspection in the case where the GPUs 591 which can perform the image processings at higher speed are used, as compared with the case where the CPU is used in each of the image processing units 59.

Further, though each of the image processing units 59 comprises the image processing memory 593 in the above-discussed preferred embodiments, the plurality of GPUs 591 may make accesses to one image processing memory 593.

Though the substrate 9 is a semiconductor substrate in the above-discussed preferred embodiments, the present invention is also useful for the appearance inspection of various substrates such as a glass substrate for photomask, a substrate for display device, a substrate for optical disk, a substrate for magnetic disk, a substrate for magneto-optic disk, a printed circuit board, a substrate for solar battery, and the like.

It goes without saying that the constituent elements shown in the above-discussed preferred embodiments and the variations may be combined with one another or omitted as long as no inconsistency is caused.

While the invention has been shown and described in detail, the foregoing description is in all aspects illustrative and not restrictive. It is therefore understood that numerous modifications and variations can be devised without departing from the scope of the invention.

What is claimed is:

1. An appearance inspection apparatus for detecting a defect of a pattern on the basis of an image of a surface of a substrate on which said pattern is formed, which is captured by an imaging part, comprising:
    an image transfer part for transferring an image data, which is obtained by imaging a region to be inspected on said substrate and which is stored in an image storing memory by said imaging part, wherein said image data includes data corresponding to a plurality of divided regions which are obtained by dividing said regions, said image data being transferred in its totality to each of a plurality of image processing memories;
    a plurality of image processing parts for performing inspection processes for defect detection on a respective part of said plurality of divided regions corresponding to respective regions to be processed thereby, out of said plurality of divided regions included in transferred image data which are transferred to said image processing memories by said image transfer part; and
    a plurality of image processing control parts for acquiring inspection tasks each prescribing inspection details, and associating said image processing part and said part of said plurality of divided regions to be inspected and controlling said plurality of image processing parts in accordance with said inspection tasks, respectively, independently of image transfer by said image transfer part;
    wherein said image processing control parts examine a same contents data comprising said image data to determine whether or not said part of said plurality of divided regions to be inspected by said image processing parts are included in said transferred image data which are transferred to said image processing memories, and
    when no image data to be inspected is included, said image processing control parts cause the image processing parts to wait until said image data including said plurality of divided regions to be inspected by said image processing arts are transferred to said image processing memories.

2. The appearance inspection apparatus according to claim 1, wherein
    said image transfer part transfers said image data to said image processing memories when said image data in predetermined amount is stored in said image storing memory.

3. The appearance inspection apparatus according to claim 2, wherein
    said imaging part includes a line sensor, and
    said image transfer part transfers said image data to said image processing memories when image data having a predetermined number of lines is acquired and stored in said image storing memory by said imaging part.

4. The appearance inspection apparatus according to claim 1, wherein
    each of said image processing parts includes a GPU (Graphics Processing Unit).

5. An appearance inspection apparatus for detecting a defect of a pattern on the basis of an image of a surface of a substrate on which said pattern is formed, which is captured by an imaging part, comprising:
    an inspection task holding part for holding a plurality of inspection tasks each prescribing a part of a plurality of divided regions to be inspected, among image data including said plurality of divided regions which are obtained by dividing a region captured by said imaging part;
    a plurality of image processing parts for performing image processing relating to defect detection;
    a plurality of image processing control parts for associating said image processing part and said part of plurality of divided regions to be inspected and controlling said plurality of image processing parts, respectively, in accordance with said inspection tasks,
    an image data holding part for holding said image data; and
    a plurality of image processing memories for storing image data having said plurality of divided regions including said part of plurality of divided regions to be processed by said image processing part,
    wherein said image processing control parts:
    cause plurality of said image processing memories to transfer image data held by said image data holding part and including said plurality of divided regions with the same contents, respectively;
    sequentially cause said plurality of image processing parts, in order of completing image processing of said part of plurality of divided regions on the basis of one of said inspection tasks, out of said plurality of divided regions included in transferred image data which are transferred to said image processing memory, to perform new image processing of a part of plurality of divided regions in accordance with a next one of said inspection tasks which are held in said inspection task holding part; and
    determine whether or not image data of said part of plurality of divided regions to be processed by said image processing part is included in said image data which are held in said image data holding part and cause said image data of said part of plurality of divided regions to be transferred to plurality of said image processing memories with the same contents, respectively, when said image data of said divided region is included.

6. The appearance inspection apparatus according to claim 5, wherein said imaging part includes a line sensor, and said image processing control parts cause said image data to be transferred to said image processing memories with the same contents, respectively, when image data having a predetermined number of lines is acquired and stored in said image storing memory by said imaging part.

7. The appearance inspection apparatus according to claim 5, wherein
each of said image processing parts includes a GPU (Graphics Processing Unit).

8. An appearance inspection method for detecting a defect of a pattern on the basis of an image of a surface of a substrate on which said pattern is formed, which is captured by an imaging part, comprising the steps of:
(a-1) a step of transferring an image data which is obtained by imaging a region to be inspected on said substrate and which is stored in an image storing memory by said imaging part to a plurality of image processing memories, including dividing said image data into a plurality of divided regions of said region;
(b-1) a step of performing inspection processes for defect detection on part of said plurality of divided regions corresponding to respective regions to be processed thereby, out of all of said plurality of divided regions included in transferred image data which are transferred to said image processing memories in said step (a-1); and
(c-1) a step of acquiring inspection tasks each prescribing inspection details and associating said inspection tasks and said plurality of divided regions and controlling said plurality of image processing parts in accordance with said inspection tasks, respectively, independently of said step (a-1),
wherein said step (b-1) being a step performed in accordance with the inspection tasks acquired in said step (c-1),
wherein said image processing control parts examine a same contents data comprising said image data to determine whether or not said part of said plurality of divided regions to be inspected by said image processing parts are included in said transferred image data which are transferred to said image processing memories, and
when no image data to be inspected is included, said image processing control parts cause the image processing parts to wait until said image data including said plurality of divided regions to be inspected by said image processing parts are transferred to said image processing memories.

9. An appearance inspection method for detecting a defect of a pattern on the basis of an image of a surface of a substrate on which said pattern is formed, which is captured by an imaging part, comprising the steps of:
(a-2) a step of holding a plurality of inspection tasks each prescribing a part of a plurality of divided regions to be inspected, among image data including said plurality of divided regions that are obtained by dividing a region captured by said imaging part, and
(b-2) a step of causing each of a plurality of image processing parts to perform image processing relating to defect detection in accordance with each of said inspection tasks held in said step (a-2),
wherein said step (b-2) sequentially cause said plurality of image processing parts, in order of completing image processing on the basis of one of said inspection tasks, to perform new image processing in accordance with a next one of said inspection tasks which are held in said step (a-2); and controlling said plurality of image processing parts, respectively, in accordance with said inspection tasks, said inspection method including:
an image data holding part for holding said image data; and
a plurality of image processing memories for storing image data having said plurality of divided regions including said part of plurality of divided regions to be processed by said image processing part,
wherein said image processing control parts:
cause a plurality of said image processing memories to transfer image data held by said image data holding part and including said plurality of divided regions with the same contents, respectively; and
sequentially cause said plurality of image processing parts, in order of completing image processing of said part of plurality of divided regions on the basis of one of said inspection tasks, out of said plurality of divided regions included in transferred image data which are transferred to said image processing memory, to perform new image processing of a part of plurality of divided regions in accordance with a next one of said inspection tasks which are held in said inspection task holding part; and
determine whether or not image data of said part of plurality of divided regions to be processed by said image processing part is included in said image data which are held in said image data holding part and cause said image data of said part of plurality of divided regions to be transferred to plurality of said image processing memories with the same contents, respectively, when said image data of said divided region is included.

* * * * *